United States Patent
Yoshida et al.

(10) Patent No.: US 9,499,212 B2
(45) Date of Patent: Nov. 22, 2016

(54) MOUNTING STRUCTURE OF INSTRUMENT PANEL REINFORCEMENT

(71) Applicant: TOYOTA JIDOSHA KABUSHIKI KAISHA, Toyota-shi (JP)

(72) Inventors: Keigo Yoshida, Nisshin (JP); Toshinao Wada, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/821,897

(22) Filed: Aug. 10, 2015

(65) Prior Publication Data

US 2016/0052562 A1 Feb. 25, 2016

(30) Foreign Application Priority Data

Aug. 20, 2014 (JP) ................. 2014-167972

(51) Int. Cl.
*B62D 25/14* (2006.01)
*B62D 27/02* (2006.01)

(52) U.S. Cl.
CPC .............. *B62D 25/145* (2013.01); *B62D 25/14* (2013.01); *B62D 27/023* (2013.01)

(58) Field of Classification Search
CPC .. B62D 24/14; B62D 24/145; B62D 24/147; B62D 27/023
USPC .................................................... 296/70, 72
See application file for complete search history.

(56) References Cited

U.S. PATENT DOCUMENTS

| 6,481,786 B1 * | 11/2002 | Kim ...................... B62D 25/145 180/90 |
| 2009/0056882 A1 | 3/2009 | Sano et al. |

FOREIGN PATENT DOCUMENTS

| DE | 10010709 C1 * | 8/2001 | ........... B62D 25/147 |
| DE | 102004026876 A1 * | 12/2005 | ........... B62D 25/147 |
| JP | 2009-61828 | 3/2009 | |
| JP | 2009-154725 | 7/2009 | |
| JP | 2010-143487 | 7/2010 | |
| JP | 2013-35485 | 2/2013 | |

* cited by examiner

*Primary Examiner* — Jason S Daniels
(74) *Attorney, Agent, or Firm* — Oblon, McClelland, Maier & Neustadt, L.L.P.

(57) ABSTRACT

Due to an insertion piece being inserted in a receiving portion, displacement of an instrument panel R/F with respect to a vehicle body in two directions that are orthogonal to a direction of insertion of the insertion piece into the receiving portion is restricted. Further, due to the insertion piece being inserted in the receiving portion, rotation of the instrument panel R/F around the direction of insertion of the insertion piece into the receiving portion is restricted. Therefore, as the insertion piece is inserted into the receiving portion at the time of installing the instrument panel R/F at the vehicle body, the instrument panel R/F can be positioned simultaneously with moving while being guided along the direction of insertion of the insertion piece into the receiving portion.

4 Claims, 6 Drawing Sheets

MOUNTING STRUCTURE OF INSTRUMENT PANEL REINFORCEMENT

CROSS-REFERENCE TO RELATED APPLICATION

This application is based on and claims priority under 35 USC 119 from Japanese Patent Application No. 2014-167972 filed on Aug. 20, 2014, which is incorporated by reference herein.

BACKGROUND

Technical Field

The present invention relates to a mounting structure of an instrument panel reinforcement.

Related Art

An invention relating to an installation structure of an instrument panel module for a vehicle is disclosed in Japanese Patent Application Laid-Open (JP-A) No. 2013-035485 (Patent Document 1). In this installation structure of an instrument panel module for a vehicle, side brackets are provided at both end portions of an instrument panel member (an instrument panel reinforcement), and engaging concave portions are formed in the side brackets. On the other hand, guide portions and engaging pins are provided at the front pillars that structure the vehicle body skeleton.

Therefore, at the time of installing the instrument panel module for a vehicle, positioning of the instrument panel member can be carried out by moving the instrument panel member from the vehicle rear side toward the vehicle front side while the side brackets are guided by the guide portions, and engaging the engaging concave portions with the engaging pins.

However, in the prior art that is disclosed in above-described Patent Document 1, there is room for improvement with regard to facilitating work. In further detail, in the installation structure of an instrument panel module for a vehicle that is disclosed in above-described Patent Document 1, the engaging pins are disposed so as to be apart in the vehicle vertical direction, and the engaging concave portions of the side brackets also are formed in correspondence therewith. Further, after the engaging pin at the vehicle upper side and the engaging portion and the vehicle upper side are engaged, the instrument panel member is rotated by using this engaging pin as the fulcrum, and the engaging pin at the vehicle lower side and the engaging portion at the vehicle lower side are engaged. Therefore, in the prior art disclosed in above-described Patent Document 1, the work of positioning the instrument panel member is complex.

SUMMARY

In consideration of the above-described circumstances, an object of the present invention is to obtain a mounting structure of an instrument panel reinforcement that can make the work of positioning an instrument panel reinforcement at a vehicle body easier.

A mounting structure of an instrument panel reinforcement relating to a first aspect of the present invention has: a receiving portion that is formed at either one of a mounting surface portion, that faces a vehicle rear side, of a vehicle body skeleton member that structures a portion of a side portion of a vehicle body, and a facing portion, that faces the mounting surface portion, of an end portion, that is fixed to the mounting surface portion, of an instrument panel reinforcement that extends in a vehicle transverse direction; or an insertion piece that is provided at another of the mounting surface portion and the facing portion, and that is formed so as to be able to be inserted into the receiving portion, and that, by being inserted in the receiving portion, restricts displacement of the instrument panel reinforcement with respect to the vehicle body in two directions that are orthogonal to a direction of insertion into the receiving portion, and restricts rotation of the instrument panel reinforcement around the direction of insertion.

In accordance with the first aspect, a portion of a side portion of the vehicle body is structured by a vehicle body skeleton member, and an end portion of the instrument panel reinforcement, that extends in the vehicle transverse direction, is fixed to the mounting surface portion, that faces the vehicle rear side, of this vehicle body skeleton member. Further, the receiving portion is formed at either one of the mounting surface portion of the vehicle body skeleton member and the facing portion, that faces the mounting surface portion, of the end portion of the instrument panel reinforcement. The insertion piece, that is formed so as to be able to be inserted into the receiving portion, is formed in the other of the mounting surface portion and this facing portion.

Therefore, at the time of installing the instrument panel reinforcement at the vehicle body, the instrument panel reinforcement can be fixed to the vehicle body in a state in which the insertion piece is inserted in the receiving portion and the end portion of the instrument panel reinforcement is positioned at the mounting surface portion of the vehicle body skeleton member.

Here, in the present invention, due to the insertion piece being inserted in the receiving portion, displacement of the instrument panel reinforcement with respect to the vehicle body in two directions that are orthogonal to the direction of insertion of the insertion piece into the receiving portion, and rotation of the instrument panel reinforcement around this direction of insertion, are restricted. Therefore, as the insertion piece is inserted into the receiving portion, the instrument panel reinforcement is positioned simultaneously with moving while being guided along the direction of insertion of the insertion piece into the receiving portion, until the end portion of the instrument panel reinforcement abuts the mounting surface portion of the vehicle body skeleton member.

In a mounting structure of an instrument panel reinforcement relating to a second aspect, in the first aspect, the receiving portion and the insertion piece are provided at one vehicle transverse direction side or another vehicle transverse direction side, and, due to the insertion piece being inserted in the receiving portion, displacement of the insertion piece in the vehicle transverse direction and a vehicle vertical direction, and rotation of the insertion piece around a vehicle longitudinal direction, are restricted.

In accordance with the second aspect, the receiving portion and the insertion piece are provided at the vehicle transverse direction one side or at the vehicle transverse direction other side. Further, due to the insertion piece being inserted in the receiving portion, displacement of the insertion piece in the vehicle transverse direction and the vehicle vertical direction, and rotation of the insertion piece around the vehicle longitudinal direction, can be restricted. Therefore, the instrument panel reinforcement can be positioned at the vehicle body by inserting the one insertion piece into the receiving-portion.

In a mounting structure of an instrument panel reinforcement relating to a third aspect, in the second aspect, the receiving portion is formed by cutting out the mounting surface portion, and is formed in a quadrangular shape that runs along the vehicle vertical direction as seen from the direction of insertion of the insertion piece, and the insertion piece is formed in a shape of a plate that extends from the facing portion, and, in a state of being inserted into the receiving portion, is disposed at an incline with respect to the vehicle vertical direction as seen from the direction of insertion of the insertion piece, and displacement of the insertion piece in the vehicle transverse direction and the vehicle vertical direction, and rotation of the insertion piece around the vehicle longitudinal direction, are restricted due to vehicle vertical direction end portions of the insertion piece abutting a peripheral edge portion of the receiving portion when the insertion piece is inserted into the receiving portion.

In accordance with the third aspect, the receiving portion is formed by cutting-out the mounting surface portion of the vehicle body skeleton member, and is formed in a quadrangular shape that runs along the vehicle vertical direction as seen from the direction of insertion of the insertion piece. On the other hand, the insertion piece is formed in a shape of a plate that extends from the portion, that faces the mounting surface portion, of the end portion of the instrument panel reinforcement. In the state of being inserted in the receiving portion, the insertion piece is disposed at an incline with respect to the vehicle vertical direction as seen from the direction of insertion of the insertion piece. Further, displacement of the insertion piece in the vehicle transverse direction and the vehicle vertical direction, and rotation of the insertion piece around the vehicle longitudinal direction, are restricted due to the vehicle vertical direction end portions of the insertion piece abutting the peripheral edge portion of the receiving portion when the insertion piece is inserted in the receiving portion.

Therefore, when the vehicle vertical direction end portions of the insertion piece abut the vehicle vertical direction peripheral edge portions of the receiving portion at the time when the insertion piece is inserted in the receiving portion, displacement of the instrument panel reinforcement in the vehicle vertical direction is restricted. Further, when the vehicle vertical direction end portions of the insertion piece abut the vehicle transverse direction peripheral edge portions of the receiving portion, displacement of the instrument panel reinforcement in the vehicle transverse direction is restricted. Moreover, when the both end portions in the vehicle vertical direction of the insertion piece abut the peripheral edge portion of the receiving portion, rotation of the instrument panel reinforcement around the vehicle longitudinal direction is restricted.

In a mounting structure of an instrument panel reinforcement relating to a fourth aspect, in the first aspect, the receiving portion is structured to include a first receiving portion that is formed at one vehicle transverse direction one side, and a second receiving portion that is formed at another vehicle transverse direction side, and the insertion piece has a first insertion piece that is inserted into the first receiving portion and that restricts displacement of the instrument panel reinforcement in either one of the vehicle transverse direction or a vehicle vertical direction, and a second insertion piece that is inserted into the second receiving portion and that restricts displacement of the instrument panel reinforcement in another of the vehicle transverse direction or the vehicle vertical direction.

In accordance with the fourth aspect of the present invention, due to the first insertion piece being inserted in the first receiving portion, displacement of the instrument panel reinforcement in either one of the vehicle transverse direction and the vehicle vertical direction is restricted. Further, due to the second insertion piece being inserted in the second receiving portion, displacement of the instrument panel reinforcement in the other of the vehicle transverse direction and the vehicle vertical direction is restricted. Moreover, due to displacement, in respectively different directions, of the both end portions of the instrument panel reinforcement being restricted, rotation of the instrument panel reinforcement around a vehicle longitudinal direction axis is restricted. Moreover, the instrument panel reinforcement is supported at plural places by the first insertion piece, the second insertion piece, the first receiving portion, and the second receiving portion.

In a mounting structure of an instrument panel reinforcement relating to a fifth aspect, in any one of the first through fourth aspects, a width of a distal end portion of the insertion piece is decreased toward a distal end of the insertion piece.

In accordance with the fifth aspect, the width of the distal end portion of the insertion piece is decreased toward the distal end of the insertion piece. Therefore, due to the insertion piece being pushed-into the receiving portion after the distal end portion of the insertion piece has been introduced into the receiving portion, the insertion piece is inserted into the receiving portion with this distal end portion being a guide.

As described above, the mounting structure of an instrument panel reinforcement relating to the first aspect has the excellent effect that the work of positioning the instrument panel reinforcement at the vehicle body can be made easier.

The mounting structure of an instrument panel reinforcement relating to the second aspect has the excellent effect that the time required for the work of installing the instrument panel reinforcement can be shortened.

The mounting structure of an instrument panel reinforcement relating to the third aspect has the excellent effect that the instrument panel reinforcement can be positioned at the vehicle body by a simple structure.

The mounting structure of an instrument panel reinforcement relating to the fourth aspect has the excellent effect that the instrument panel reinforcement can be positioned at the vehicle body in a stable state.

The mounting structure of an instrument panel reinforcement relating to the fifth aspect has the excellent effect that the insertion piece can be easily inserted into the receiving portion.

BRIEF DESCRIPTION OF DRAWINGS

FIG. 6A is an enlarged cross-sectional view showing the structure at the vehicle transverse direction left side of a mounting structure of an instrument panel reinforcement (a cross-sectional view showing the state cut along line 6A-6A of FIG. 4), and FIG. 6B is an enlarged cross-sectional view showing the structure at the vehicle transverse direction right side of the mounting structure of an instrument panel reinforcement (a cross-sectional view showing the state cut along line 6B-6B of FIG. 4).

DETAILED DESCRIPTION

<First Embodiment>

A first embodiment of a mounting structure of an instrument panel reinforcement relating to the present invention is described hereinafter by using FIG. 1 through FIG. 4. Note that arrow FR that is shown appropriately in the respective drawings indicates the vehicle front side, arrow UP indicates the vehicle upper side, and arrow RH indicates the vehicle transverse direction right side.

Figure 4:
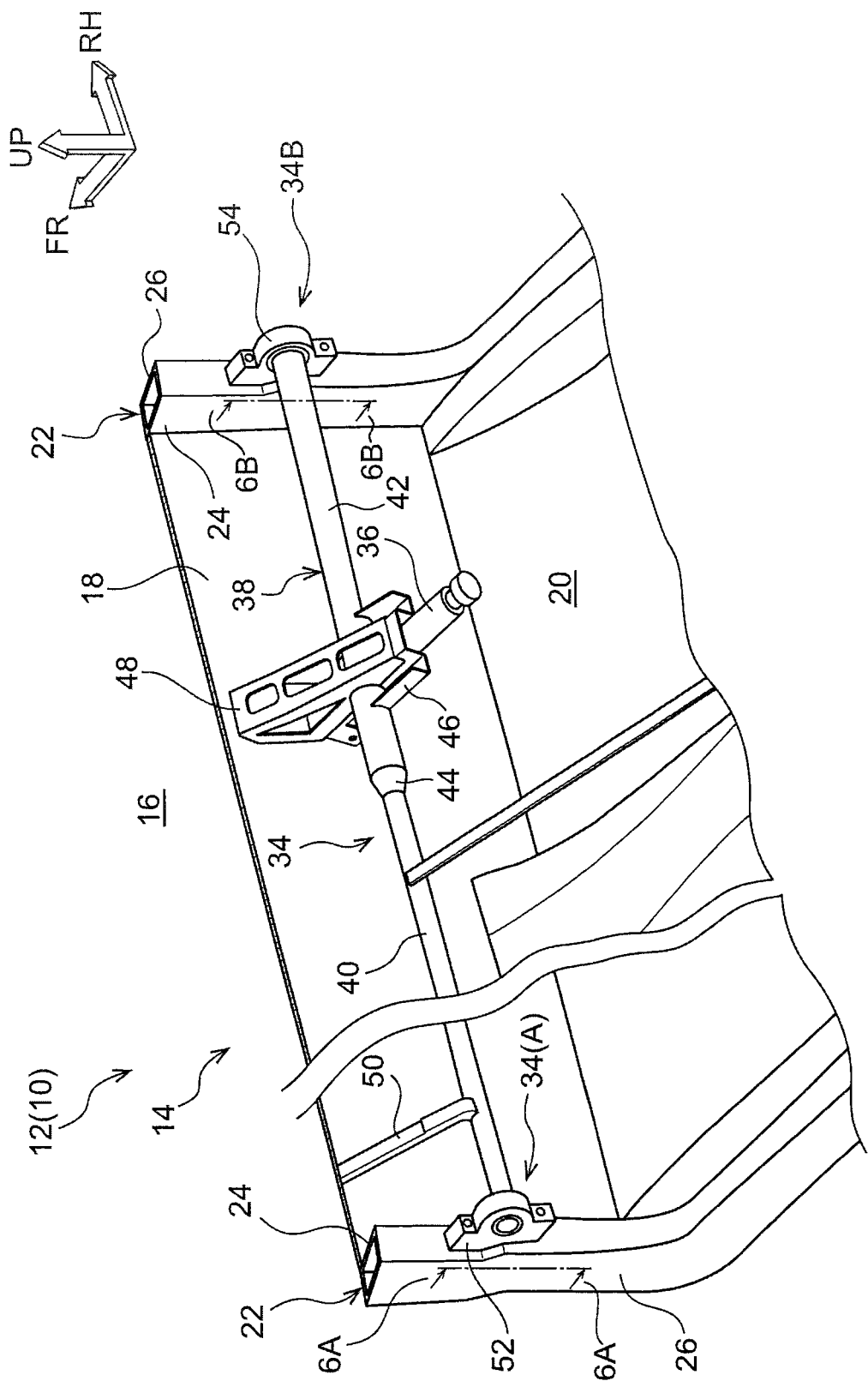
FIG. 4 is a perspective view showing the relationship between a vehicle body and the mounting structure of an instrument panel reinforcement relating to the present embodiment.

First, the front portion structure of a vehicle 10 relating to the present embodiment is described by using FIG. 4. As shown in FIG. 4, a power unit chamber 16 in which an unillustrated power unit is accommodated is provided at a vehicle body front portion 14 of a vehicle body 12. A dash panel 18, that extends in the vehicle transverse direction and the vehicle vertical direction and structures a portion of the vehicle body 12, is provided at the vehicle rear side of this power unit chamber 16. The power unit chamber 16 and a cabin 20 are separated by this dash panel 18. Note that an unillustrated cowl top panel is joined to the upper end portion of the dash panel 18.

Figure 1:
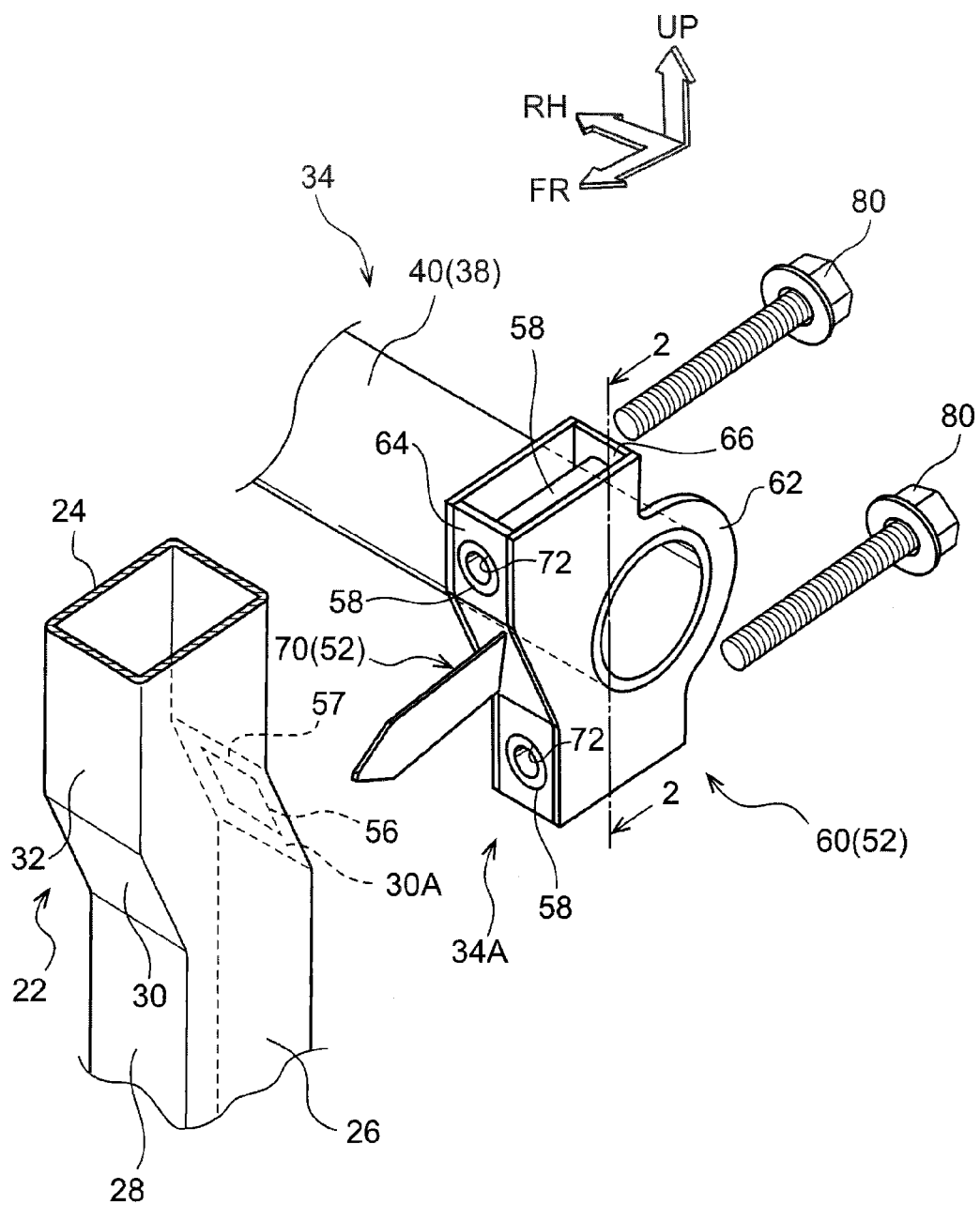
FIG. 1 is an enlarged perspective view showing the structure of a mounting structure of an instrument panel reinforcement relating to a first embodiment.

Further, a pair of left and right front pillars 22 that serve as vehicle body skeleton members are disposed at the both side portions of the vehicle front side of the vehicle body 12. The front pillar 22 is structured to include a pillar inner panel 24 that structures the vehicle transverse direction inner side of the front pillar 22, and a pillar outer panel 26 that structures the vehicle transverse direction outer side of the front pillar 22. Further, as shown in FIG. 1 as well, as an example, the front pillar 22 is a structure that is bent. In further detail, a pillar lower portion 28 stands up from the vehicle lower side toward the vehicle upper side, and a bent portion 30, that is bent from the upper end portion of the pillar lower portion 28, extends toward the vehicle front side, and a pillar upper portion 32, that is bent from the upper end portion of the bent portion 30, extends toward the vehicle upper side.

Further, an instrument panel reinforcement 34 (hereinafter abbreviated as "instrument panel R/F 34") bridges between the pair of left and right front pillars 22. This instrument panel R/F 34 functions as a supporting member that supports a steering column 36 and the like. The instrument panel R/F 34 is structured to include a main body portion 38 that extends in the vehicle transverse direction, and fixing brackets 52, 54 that are described later and that are provided at the end portions of the main body portion 38.

The main body portion 38 is structured to include a small diameter portion 40 that is disposed at the front passenger's seat side, a large diameter portion 42 that is disposed at the driver's seat side, and a connecting portion 44 that connects the small diameter portion 40 and the large diameter portion 42. The small diameter portion 40 is formed in the shape of a tube that extends in the vehicle transverse direction. On the other hand, in the same way as the small diameter portion 40, the large diameter portion 42 also is formed in the shape of a tube that extends in the vehicle transverse direction, and, in further detail, in the shape of a tube whose inner diameter and outer diameter are set to be larger than the inner diameter and the outer diameter of the small diameter portion 40. Further, the connecting portion 44 is formed integrally with the large diameter portion 42 at the end portion that is at the small diameter portion 40 side (the front passenger's seat side) of the large diameter portion 42, and the diameter of the connecting portion 44 decreases toward the small diameter portion 40 side, and the connecting portion 44 is narrowed so as to match the outer shape of the small diameter portion 40. Further, the front passenger's seat side end portion of the connecting portion 44 and the driver's seat side end portion of the small diameter portion 40 are joined by joining means such as welding or the like.

Further, a steering support 46 that fixes the steering column 36 is provided at the large diameter portion 42. The steering support 46 is connected to the dash panel 18 or the cowl top panel by a driver's seat side brace member 48. On the other hand, the small diameter portion 40 is connected to the dash panel 18 or the cowl top panel by a front passenger's seat side brace member 50 that extends in the vehicle longitudinal direction.

Here, the present embodiment has the feature that the instrument panel R/F 34 is mounted to the front pillars 22 by a mounting structure of an instrument panel reinforcement that is structured to include the fixing brackets 52, 54, a receiving portion 56, and collars 58. The structure of the mounting structure of an instrument panel reinforcement that is the main portion of the present invention is described in detail hereinafter.

Figure 2:
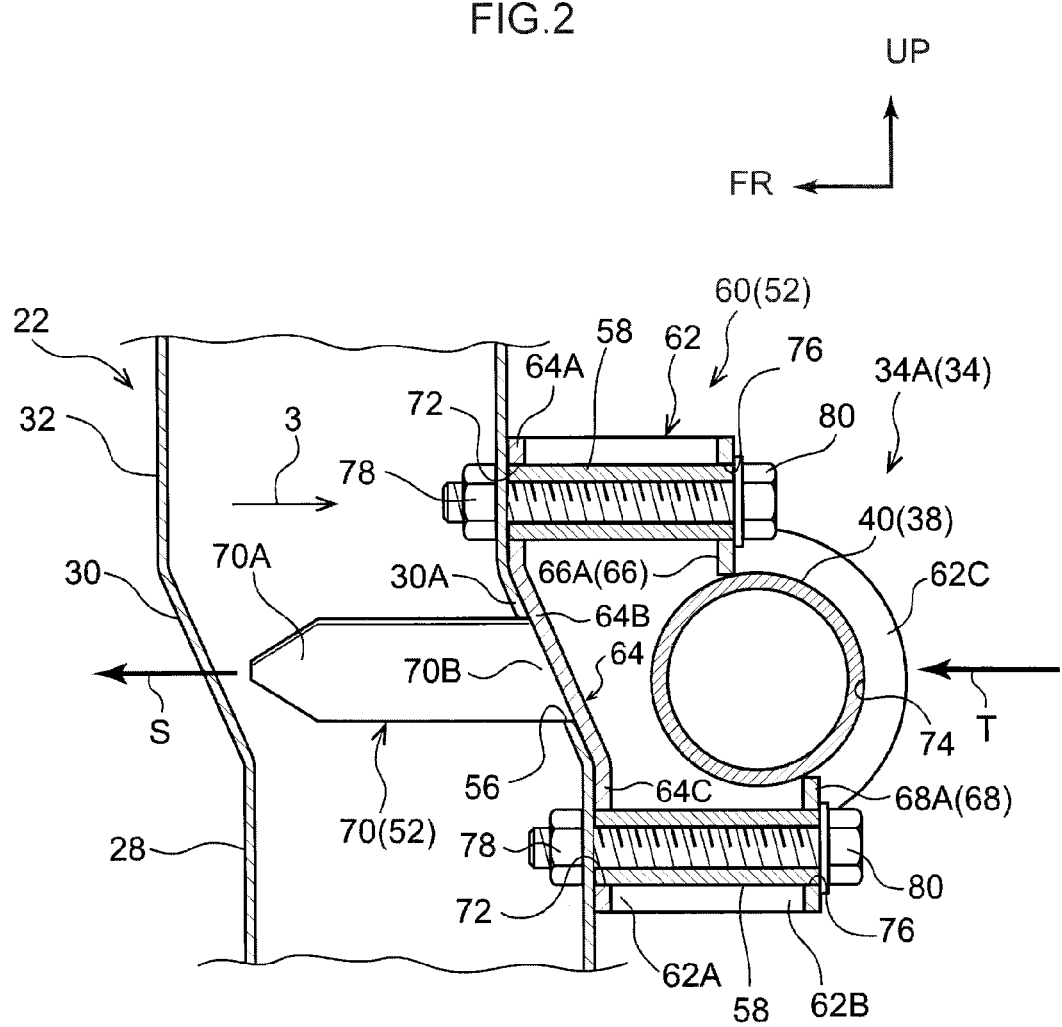
FIG. 2 is an enlarged cross-sectional view showing the structure of the mounting structure of an instrument panel reinforcement relating to the first embodiment (a cross-sectional view showing the state cut along line 2-2 of FIG. 1).
Figure 3:
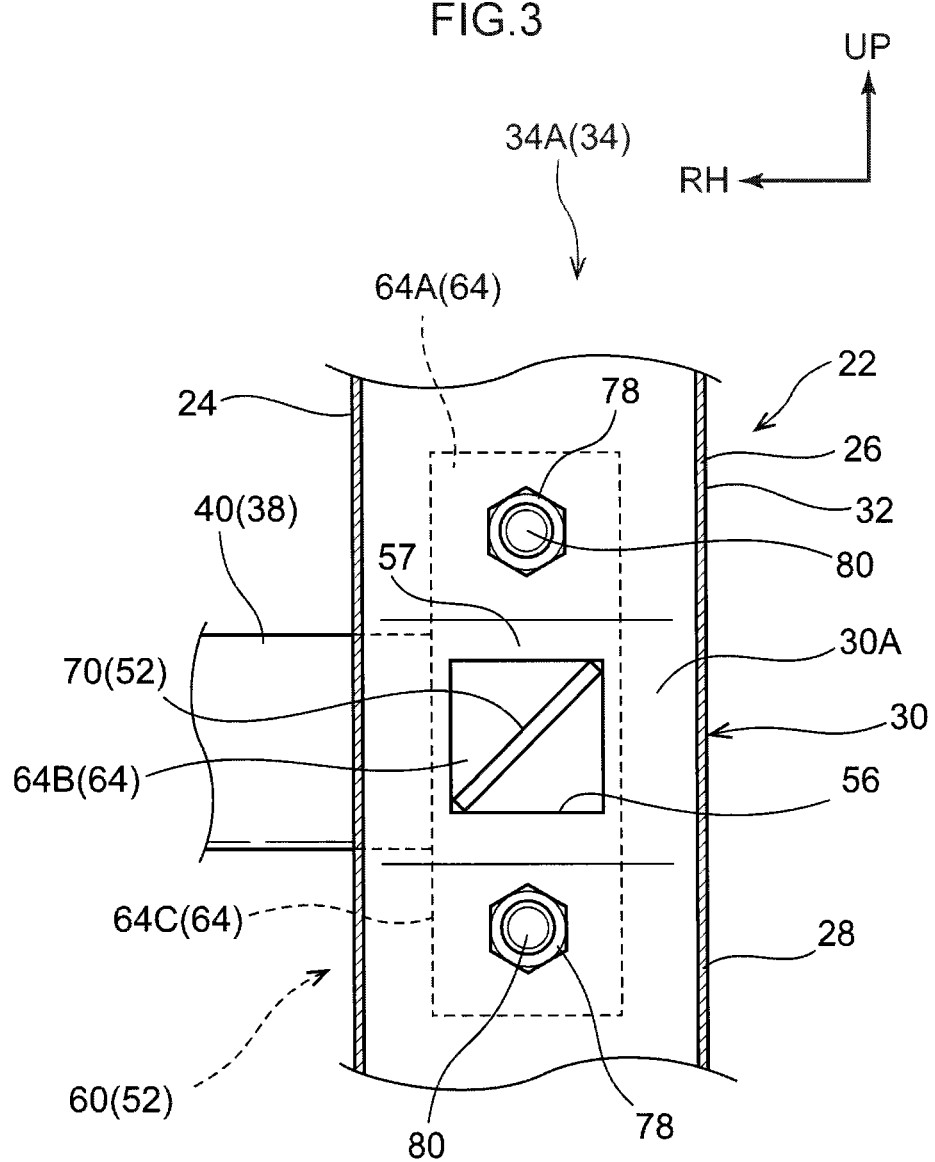
FIG. 3 is an enlarged front view that is seen from the vehicle front side and shows the structure of the mounting structure of an instrument panel reinforcement relating to the first embodiment (a view seen in direction 3 of FIG. 2).

As shown in FIG. 1 through FIG. 3, the receiving portion 56 is formed in a rear wall portion 30A, that serves as a mounting surface portion and that faces toward the vehicle rear side, of the bent portion 30 of the front pillar 22 at the vehicle transverse direction left side. This receiving portion 56 is formed by the central portion of the rear wall portion 30A being cut-out, and in the present embodiment, as an example, is formed in a quadrangular shape that runs along the vehicle vertical direction as seen from the vehicle rear side, and more concretely, is formed in a square shape.

On the other hand, the fixing bracket 52 structures an end portion 34A at the vehicle transverse direction left side (front passenger's seat side) of the instrument panel R/F 34, and is structured to include a fixing portion 60 and an insertion piece 70. The fixing portion 60 includes a pair of side wall portions 62 that face in the vehicle transverse direction, a front wall portion 64 that faces the vehicle front side, an upper rear wall portion 66 that faces the vehicle rear side, and a lower rear wall portion 68 that similarly faces the vehicle rear side. The fixing portion 60 is formed in the shape of an angular tube whose length direction is the vehicle vertical direction. Note that FIG. 2 is a cross-sectional view showing the state cut along line 2-2 of FIG. 1, but, to facilitate understanding of the structure of the fixing bracket 52, the insertion piece 70 is not shown in cross-section.

The structure of the fixing portion 60 is described in further detail. The front wall portion 64 includes an upper abutting portion 64A, an inclined portion 64B, and a lower abutting portion 64C, and is formed so as to be bent so as to be able to abut the vehicle rear side of the front pillar 22 that is bent. Further, the upper abutting portion 64A abuts the pillar upper portion 32, the inclined portion 64B abuts the bent portion 30, and the lower abutting portion 64C abuts the pillar lower portion 28. Namely, the inclined portion 64B at the front wall portion 64 is the portion that faces the rear wall portion 30A of the bent portion 30. Further, insertion-through portions 72, that the collars 58 that are cylindrical can be inserted through, are formed in the front wall portion 64 due to the central portion of the upper abutting portion 64A and the central portion of the lower abutting portion 64C being cut-out in circular forms.

The side wall portions 62 are formed and disposed such that edge portions 62A at the vehicle front sides thereof run along the front wall portion 64. The front wall portion 64 is, in a state of being nipped by the pair of side wall portions 62, joined to the side wall portions 62 by joining means such as welding or the like. On the other hand, edge portions 62B at the vehicle rear sides of the side wall portions 62 are structured similarly to the edge portions 62A, but differ with regard to the point that the length direction central portions of the side wall portions 62 are projected-out in semicircular shapes toward the vehicle rear sides such that semicircular portions 62C are formed. Further, the edge portion 62B sides at the length direction central portions of the side wall portions 62 are cut-out in the forms of circles that are centered around the centers of the semicircular portions 62C, such that fit-together portions 74, with which the small diameter portion 40 of the instrument panel R/F 34 can fit-together, are formed.

The upper rear wall portion 66 is disposed along the vehicle upper side portions at the edge portions 62B of the side wall portions 62, and faces the upper abutting portion 64A of the front wall portion 64, and, in a state of being nipped by the pair of side wall portions 62, is joined to the side wall portions 62 by joining means such as welding or the like. Further, the shape of the upper rear wall portion 66 is made to be a rectangular plate shape, and is set such that, when the small diameter portion 40 is fit-together with the fit-together portions 74 of the side wall portions 62, an end portion 66A at the vehicle lower side of the upper rear wall portion 66 abuts the small diameter portion 40.

The lower rear wall portion 68 is disposed along the vehicle lower side portions at the edge portions 62B of the side wall portions 62, and faces the lower abutting portion 64C of the front wall portion 64, and, in a state of being nipped by the pair of side wall portions 62, is joined to the side wall portions 62 by joining means such as welding or the like. Further, the shape of the lower rear wall portion 68 is made to be a rectangular plate shape, and is set such that, when the small diameter portion 40 is fit-together with the fit-together portions 74 of the side wall portions 62, an end portion 68A at the vehicle upper side of the lower rear wall portion 68 abuts the small diameter portion 40.

Further, the end portion of the small diameter portion 40 is fit-together with the fit-together portions 74 of the side wall portions 62, and this end portion is joined to the side wall portions 62, the upper rear wall portion 66 and the lower rear wall portion 68 by joining means such as welding or the like. Note that, as seen from the vehicle rear side (the direction of arrow T in FIG. 2), the end portion of the small diameter portion 40 is in a state in which a predetermined length thereof is exposed between the upper rear wall portion 66 and the lower rear wall portion 68.

Further, insertion-through portions 76, that correspond to the insertion-through portions 72 of the front wall portion 64, are formed in the upper rear wall portion 66 and the lower rear wall portion 68. Moreover, weld nuts 78 that correspond to the insertion-through portions 72, 76 are provided at the front pillar 22. Further, the collars 58 are inserted-through the insertion-through portions 72, 76, and, due to the weld nuts 78 being screwed-together with bolts 80 in the state in which the bolts 80 are inserted-through the collars 58, the end portion 34A of the instrument panel R/F 34 is fixed to the front pillar 22.

On the other hand, the insertion piece 70 is formed in the shape of a plate that extends from the central portion of the inclined portion 64B at the front wall portion 64, such that the length direction of the insertion piece 70 is parallel to the axial directions of the insertion-through portions 72, 76. A distal end portion 70A of the insertion piece 70 is made to be a taper shape whose width is decreased toward the distal end of the insertion piece 70. Note that the insertion piece 70 is, as an example, formed by press working a plate member (a steel member) or the like, and a proximal end portion 70B of the insertion piece 70 is joined to the central portion of the inclined portion 64B at the front wall portion 64 by joining means such as welding or the like.

In further detail, the length in the length direction and the length in the short-side direction of the insertion piece 70 are set to lengths that are such that the insertion piece 70 can be inserted into the receiving portion 56 of the front pillar 22 with the direction of insertion (the direction of arrow S in FIG. 2) being the vehicle longitudinal direction. Concretely, as shown in FIG. 3, the insertion piece 70 is disposed at the front wall portion 64 of the fixing portion 60 so as to be, as an example, inclined at a 45° angle with respect to the vehicle vertical direction as seen from the vehicle longitudinal direction, in the state in which the insertion piece 70 is inserted in the receiving portion 56. Further, the length, in the short-side direction, of the insertion piece 70 is set to be longer than the length of one side of the insertion-through portion 72 and shorter than the length of the diagonal line. Further, in the state in which the insertion piece 70 is inserted in the receiving portion 56, the insertion piece 70 is in a state in which the vehicle upper side end portion thereof abuts the vehicle upper side of a peripheral edge portion 57 of the receiving portion 56, and the vehicle lower side end portion thereof abuts the vehicle lower side of the peripheral edge portion 57 of the receiving portion 56.

At the insertion piece 70 that is structured as described above, displacement of the insertion piece 70 in the vehicle transverse direction and the vehicle vertical direction is restricted due to the vehicle vertical direction end portions of the insertion piece 70 abutting the peripheral edge portion 57 of the receiving portion 56. Further, rotation of the insertion piece 70 around the vehicle longitudinal direction is restricted due to the vehicle vertical direction both end portions of the insertion piece 70 abutting the peripheral edge portion 57 of the receiving portion 56. Namely, due to the insertion piece 70 being inserted in the receiving portion 56, displacement of the instrument panel R/F 34 with respect to the vehicle body 12 in two directions, that are orthogonal to the direction of insertion of the insertion piece 70 into the receiving portion 56, is restricted. Moreover, due to the insertion piece 70 being inserted in the receiving portion 56, rotation of the instrument panel R/F 34 around the direction of insertion of the insertion piece 70 into the receiving portion 56 is restricted.

On the other hand, the fixing bracket 54, that structures an end portion 34B at the vehicle transverse direction right side (driver's seat side) of the instrument panel R/F 34, differs from the fixing bracket 52 with respect to the point that the insertion piece 70 is not provided. Further, because the fixing bracket 54 is mounted to the large diameter portion 42 at the main body portion 38 of the instrument panel R/F 34, the size of the fit-together portions 74, the shape of the upper rear wall portion 66, and the shape of the lower rear wall portion 68 differ from those at the fixing bracket 54. However, because the fixing bracket 52 and the fixing bracket 54 have basically similar structures, the end portion 34B of the instrument panel R/F 34 also is fixed to the front pillar 22 in the same way as the end portion 34A. Note that the fixing portion 60 of the fixing bracket 52 is structured so as to conform to the shape of the large diameter portion 42, and, by using a spacer at the time of mounting the small diameter portion 40 to the fixing bracket 52, the fixing portion 60 can be used as a member common to the fixing brackets 52, 54.

(Operation and Effects of Present Embodiment)

Operation and effects of the present embodiment are described next.

In the present embodiment, as shown in FIG. 1, portions of the side portions of the vehicle body 12 are structured by the front pillars 22. Further, the end portions 34A, 34B of the instrument panel R/F 34 that extends in the vehicle transverse direction are fixed to the rear wall portions 30A, that face toward the vehicle rear side, of the front pillars 22. Further, the receiving portion 56 is formed in the rear wall portion 30A of the front pillar 22. The insertion piece 70, that is formed so as to be able to be inserted into the receiving portion 56, is provided at the inclined portion 64B of the fixing bracket 52 that is provided at the end portion 34A of the instrument panel R/F 34.

Here, in the present embodiment, due to the insertion piece 70 being inserted in the receiving portion 56, displacement of the instrument panel R/F 34 with respect to the vehicle body 12 in two directions that are orthogonal to the direction of insertion of the insertion piece 70 into the receiving portion 56 is restricted. Further, rotation of the instrument panel R/F 34, around the direction of insertion of the insertion piece 70 into the receiving portion 56, is restricted due to the insertion piece 70 being inserted in the receiving portion 56.

Therefore, at the time of installing the instrument panel R/F 34 at the vehicle body 12, as the insertion piece 70 is inserted into the receiving portion 56, the instrument panel R/F 34 is positioned simultaneously with moving while being guided along the direction of insertion of the insertion piece 70 into the receiving portion 56. Then, at the time when the end portion 34A of the instrument panel R/F 34 abuts the rear wall portion 30A of the front pillar 22, the end portion 34A of the instrument panel R/F 34 is mounted to the rear wall portion 30A of the front pillar 22. In this way, in the present embodiment, upon positioning the instrument panel R/F 34 at the vehicle body 12 by a single operation, the instrument panel R/F 34 can be fixed to the vehicle body 12. As a result, the work of positioning the instrument panel R/F 34 with respect to the vehicle body 12 can be made easier.

Further, in the present embodiment, the receiving portion 56 and the insertion piece 70 are provided at the vehicle transverse direction left side. Moreover, due to the insertion piece 70 being inserted in the receiving portion 56, displacement of the insertion piece 70 in the vehicle transverse direction and the vehicle vertical direction, and rotation of the insertion piece 70 around the vehicle longitudinal direction, can be restricted. Therefore, by inserting the one insertion piece 70 into the receiving portion 56, the instrument panel R/F 34 can be positioned at the vehicle body 12, and, as a result, the time required for the work of installing the instrument panel R/F 34 can be shortened.

Moreover, in the present embodiment, the receiving portion 56 is formed by cutting-out the rear wall portion 30A of the front pillar 22, and is formed in a quadrangular shape that runs along the vehicle vertical direction as seen from the direction of insertion of the insertion piece 70. On the other hand, the insertion piece 70 is formed in the shape of a plate that extends from the inclined portion 64B of the fixing bracket 52 that is provided at the end portion 34A of the instrument panel R/F 34. Further, the insertion piece 70 is, in a state of being inserted in the receiving portion 56, disposed at an incline with respect to the vehicle vertical direction, as seen from the direction of insertion of the insertion piece 70. Further, when the insertion piece 70 is inserted in the receiving portion 56, due to the vehicle vertical direction end portions of the insertion piece 70 abutting the peripheral edge portion 57 of the receiving portion 56, displacement of the insertion piece 70 in the vehicle transverse direction and the vehicle vertical direction is restricted. Further, due to the vehicle vertical direction end portions of the insertion piece 70 abutting the peripheral edge portion 57 of the receiving portion 56, rotation of the insertion piece 70 around the vehicle longitudinal direction is restricted.

Therefore, at the time when the insertion piece 70 is inserted in the receiving portion 56, when the vehicle vertical direction end portions of the insertion piece 70 abut the vehicle vertical direction peripheral edge portions of the receiving portion 56, displacement of the instrument panel R/F 34 in the vehicle vertical direction is restricted. Further, when the vehicle vertical direction end portions of the insertion piece 70 abut the vehicle transverse direction peripheral edge portions of the receiving portion 56, displacement of the instrument panel R/F 34 in the vehicle transverse direction is restricted. Moreover, when the vehicle vertical direction both end portions of the insertion piece 70 abut the peripheral edge portion 57 of the receiving portion 56, rotation of the instrument panel R/F 34 around the vehicle longitudinal direction is restricted. As a result, positioning of the instrument panel R/F 34 at the vehicle body 12 can be carried out by a simple structure.

In addition, in the present embodiment, the width of the distal end portion 70A of the insertion piece 70 is decreased toward the distal end of the insertion piece 70. Therefore, by pushing the insertion piece 70 into the receiving portion 56 after the distal end portion 70A of the insertion piece 70 has been introduced into the receiving portion 56, the insertion piece 70 is inserted into the receiving portion 56 with the distal end portion 70A being a guide, and as a result, the insertion piece 70 can be easily inserted into the receiving portion 56.

<Second Embodiment>

Figure 5:
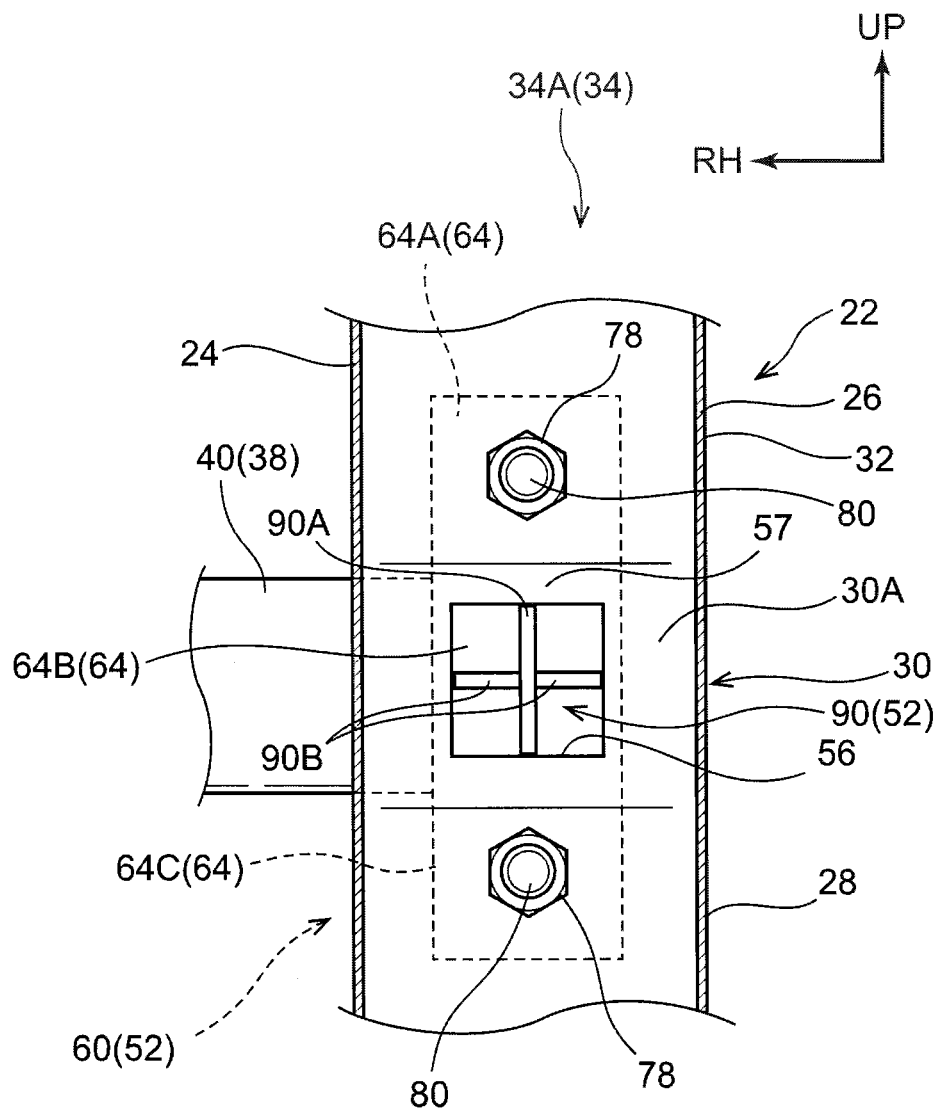
FIG. 5 is an enlarged front view that is seen from the vehicle front side (corresponding to direction 3 of FIG. 2), and shows the structure of a mounting structure of an instrument panel reinforcement relating to a second embodiment.

The structure of a second embodiment of a mounting structure of an instrument panel reinforcement relating to the present invention is described next by using FIG. 5. Note that structural portions that are the same as those of the above-described first embodiment are denoted by the same numbers, and description thereof is omitted.

In the above-described first embodiment, the insertion piece 70 is structured from a single steel member, but the present embodiment has the feature that an insertion piece 90 is structured by plural steel members.

In detail, the insertion piece 90 includes a vertical plate portion 90A and a pair of lateral plate portions 90B, and is set to a shape that is such that the insertion piece 90 can be inserted into the receiving portion 56 with the vehicle longitudinal direction being the direction of insertion. Concretely, the short-side direction of the vertical plate portion 90A is made to be the vehicle vertical direction, and the length direction of the vertical plate portion 90A is made to be the vehicle longitudinal direction, and the vertical plate portion 90A is disposed at the central portion of the inclined portion 64B at the front wall portion 64. On the other hand, the short-side direction of the lateral plate portions 90B is made to be the vehicle transverse direction, and the length direction of the lateral plate portions 90B is made to be the vehicle vertical direction, and the lateral plate portions 90B are joined, by joining means such as welding or the like, to the vehicle vertical direction central portions of the vehicle transverse direction outer side surface and the vehicle transverse direction inner side surface of the vertical plate portion 90A. Further, the vertical plate portion 90A is made to be a shape that is similar to the insertion piece 70 of the first embodiment, and the lateral plate portions 90B are made to be the same shape as the insertion piece 70 being divided at the central line in the length direction. Moreover, the insertion piece 90 is structured so as to be cross-shaped as seen from the vehicle longitudinal direction in the state in which the insertion piece 90 is inserted in the receiving portion 56, and the vehicle vertical direction both end portions and the vehicle transverse direction both end portions of the insertion piece 90 abut the peripheral edge portion 57 of the receiving portion 56.

Also in accordance with the mounting structure of an instrument panel reinforcement that is structured in this way, when the insertion piece 90 is inserted in the receiving portion 56, the vehicle vertical direction end portions of the vertical plate portion 90A abut the peripheral edge portion 57 of the receiving portion 56. Due thereto, displacement of the insertion piece 90 in the vehicle vertical direction is restricted. Further, due to the vehicle transverse direction end portions of the lateral plate portions 90B abutting the peripheral edge portion 57 of the receiving portion 56, displacement of the insertion piece 90 in the vehicle transverse direction is restricted. Moreover, due to any two places, among the vehicle vertical direction both end portions of the vertical plate portion 90A and the vehicle transverse direction both end portions of the lateral plate portions 90B, abutting the peripheral edge portion 57 of the receiving portion 56, rotation of the insertion piece 70 around the vehicle longitudinal direction is restricted.

Therefore, in the present embodiment as well, operation and effects that are similar to those of the above-described embodiment are exhibited. Further, in the present embodiment, because the insertion piece 90 is structured by plural steel members, the rigidity of the insertion piece 90 improves. Further, the short-side direction of the vertical plate portion 90A is made to be the vehicle vertical direction, and the short-side direction of the lateral plate portions 90B is made to be the vehicle transverse direction, and, because the vertical plate portion 90A and the lateral plate portions 90B are disposed at the front wall portions 64 of the fixing brackets 52, 54 respectively, positioning of the insertion piece 90 with respect to the front wall portion 64 is easy.

<Third Embodiment>

The structure of a third embodiment of a mounting structure of an instrument panel reinforcement relating to the present invention is described next by using FIG. 6. Note that structural portions that are the same as those of the above-described first embodiment are denoted by the same numbers, and description thereof is omitted.

In the above-described first embodiment, the insertion piece 70 and the receiving portion 56 are provided at the vehicle transverse direction left side. However, the present embodiment has the feature that insertion pieces and receiving portions are provided at the vehicle transverse direction both sides.

In detail, in the present embodiment, a first receiving portion 100 is formed in the front pillar 22 that is disposed at the vehicle transverse direction left side, and a second receiving portion 102 is formed in the front pillar 22 that is disposed at the vehicle transverse direction right side. Note that the first receiving portion 100 and the second receiving portion 102 have structures that are similar to the structure of the receiving portion 56 of the first embodiment.

Figure 6A:
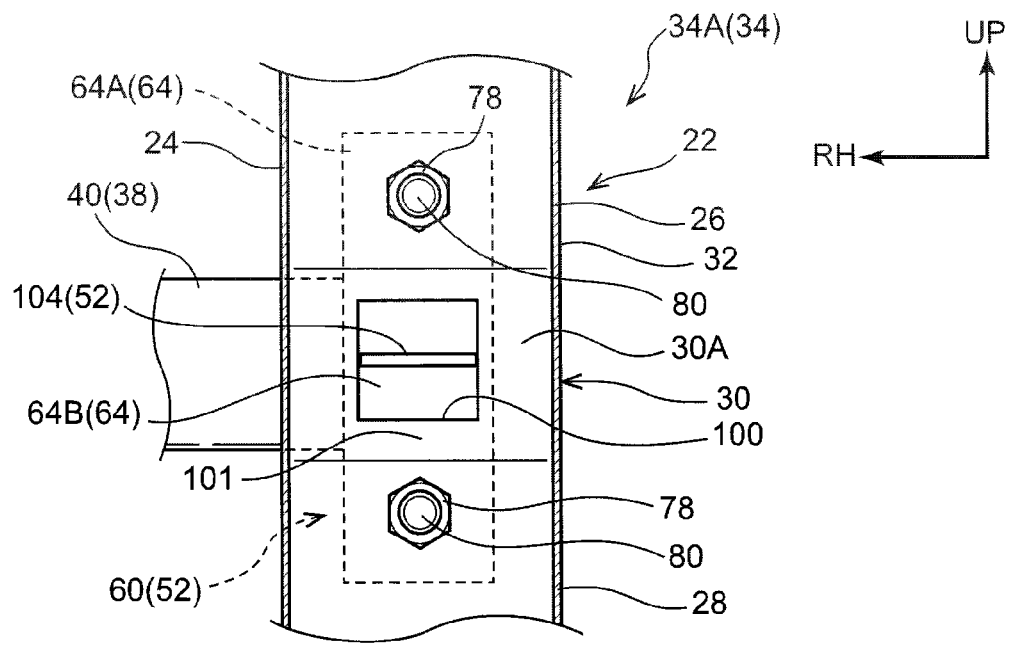
FIGS. 6A and 6B relate to a third embodiment.
Figure 6B:
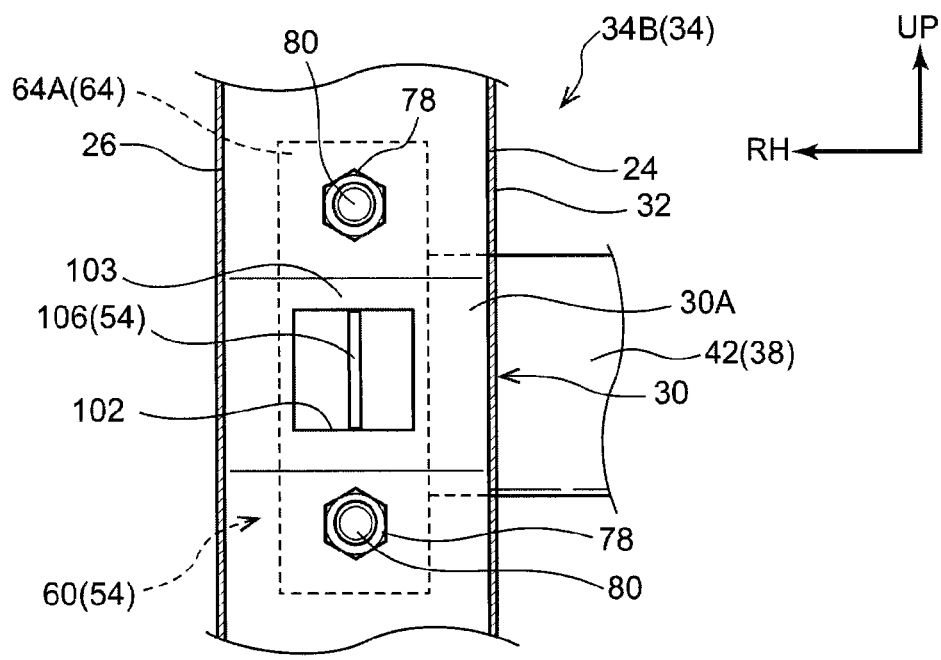

Further, a first insertion piece 104 is provided at the fixing bracket 52 that structures the end portion 34A at the vehicle transverse direction left side of the instrument panel R/F 34. On the other hand, a second insertion piece 106 is provided at the fixing bracket 54 that structures the end portion 34B at the vehicle transverse direction right side of the instrument panel R/F 34. Further, in the present embodiment, as an example, as shown in FIG. 6A, the first insertion piece 104 that is provided at the vehicle transverse direction left side is disposed with the short-side direction thereof being the vehicle transverse direction. On the other hand, as shown in FIG. 6B, the second insertion piece 106 that is provided at the vehicle transverse direction right side is disposed with the short-side direction thereof being the vehicle vertical direction. Moreover, the first insertion piece 104 and the second insertion piece 106 are structured similarly to the insertion piece 70 of the first embodiment. The first insertion piece 104 and the second insertion piece 106 can be inserted, with the vehicle longitudinal direction being the directions of insertion thereof, into the first receiving portion 100 and the second receiving portion 102, respectively.

In further detail, in the state in which the first insertion piece 104 is inserted in the first receiving portion 100, the vehicle transverse direction left side end portion of the first insertion piece 104 abuts the vehicle transverse direction left side of a peripheral edge portion 101 of the first receiving portion 100. On the other hand, the vehicle transverse direction right side end portion of the first insertion piece 104 abuts the vehicle transverse direction right side of the peripheral edge portion 101 of the first receiving portion 100. Further, in the state in which the second insertion piece 106 is inserted in the second receiving portion 102, the vehicle upper side end portion of the second insertion piece 106 abuts the vehicle upper side of a peripheral edge portion 103 of the second receiving portion 102. On the other hand, the vehicle lower side end portion of the second insertion piece 106 abuts the vehicle lower side of the peripheral edge portion 103 of the second receiving portion 102.

In the mounting structure of an instrument panel reinforcement that is structured in this way, due to the first insertion piece 104 being inserted in the first receiving portion 100, the vehicle transverse direction end portions of the first insertion piece 104 abut the peripheral edge portion 101 of the first receiving portion 100. Due thereto, displacement of the instrument panel R/F 34 in the vehicle transverse direction is restricted. Further, due to the second insertion piece 106 being inserted in the second receiving portion 102, the vehicle vertical direction end portions of the second insertion piece 106 abut the peripheral edge portion 103 of the second receiving portion 102. Due thereto, displacement of the instrument panel R/F 34 in the vehicle vertical direction is restricted. Moreover, due to displacement in respectively different directions of the both end portions of the instrument panel R/F 34 being restricted, rotation of the instrument panel R/F 34 around the vehicle longitudinal direction is restricted. Moreover, the instrument panel R/F 34 is supported at plural places by the first insertion piece 104, the second insertion piece 106, the first receiving portion 100 and the second receiving portion 102. In this way, in the present embodiment, the instrument panel R/F 34 can be positioned at the vehicle body 12 in a stable state.

<Supplementary Description of Above-Described Embodiments>

(1) In the above-described first embodiment, the insertion piece 70 is disposed so as to be tilted by 45° with respect to the vehicle vertical direction, but the angle of tilting is not limited to 45° and may be changed appropriately.

(2) In the above-described first embodiment and second embodiment, the insertion piece 70 and the receiving portion 56 are provided at the vehicle transverse direction left side, but there may be a structure in which they are provided at the vehicle transverse direction right side. Further, the shape of the receiving portion 56 is not limited to a quadrangular shape, and may be made to be any of various shapes such as a triangular shape or an oval shape or the like, provided that it is not a perfect circular shape.

(3) In the above-described third embodiment, the first insertion piece 104 that is provided at the vehicle transverse direction left side is disposed such that the short-side direction thereof is the vehicle transverse direction, and the second insertion piece 106 that is provided at the vehicle transverse direction right side is disposed such that the short-side direction thereof is the vehicle vertical direction. However, the present invention is not limited to this. For example, the first insertion piece 104 that is provided at the vehicle transverse direction left side may be disposed such that the short-side direction thereof is the vehicle vertical direction, and the second insertion piece 106 that is provided at the vehicle transverse direction right side may be disposed such that the short-side direction thereof is the vehicle transverse direction. Moreover, there may be a structure in which the first receiving portion 100 and the second receiving portion 102 are respectively formed along directions that are inclined with respect to the vehicle vertical direction, and the first insertion piece 104 and the second insertion piece 106 are disposed such that the short-side direction of the first insertion piece 104 and the short-side direction of the second insertion piece 106 are different. Due thereto, displacement of the instrument panel R/F 34 in two directions, that differ from the vehicle vertical direction and the vehicle transverse direction, with respect to the vehicle body 12 can be restricted.

(4) In the above-described embodiments, the direction of insertion of the insertion piece into the receiving portion is made to be the vehicle longitudinal direction, but the present invention is not limited to this. For example, the insertion piece 70, the first insertion piece 104, the second insertion piece 106, the receiving portion 56, the first receiving portion 100 and the second receiving portion 102 may be structured such that the direction of insertion of the insertion piece into the receiving portion is a direction that is inclined with respect to the vehicle longitudinal direction.

(5) Further, in the above-described embodiments, the receiving portion is formed in the rear wall portion 30A of the front pillar 22, and the insertion piece is provided at the end portion 34A of the instrument panel R/F 34 or at the end portion 34B of the instrument panel R/F 34. However, the present invention is not limited to this. For example, the insertion piece may be provided at the rear wall portion 30A of the front pillar 22, and the receiving portion may be formed at the end portion 34A of the instrument panel R/F 34 or at the end portion 34B of the instrument panel R/F 34. Moreover, there may be a structure in which the receiving portion or the insertion piece is provided at a vehicle body skeleton member other than the front pillar 22.

(6) Moreover, although the above-described embodiments are structures such that the insertion piece abuts the peripheral edge portion of the receiving portion when the insertion piece is inserted in the receiving portion, the present invention is not limited to this. For example, in the first embodiment, there may be a structure in which the receiving portion 56 is made to be one size larger. More concretely, there may be a structure that is provided with the receiving portion 56 that is quadrangular and at which the lengths of the respective sides are longer than those of the receiving portion 56 of the first embodiment. With such a structure, in a case in which the insertion piece 70 is inserted into the receiving portion 56 so as to go along the center of the receiving portion 56, the insertion piece 70 is inserted without abutting the peripheral edge portion 57 of the receiving portion 56. However, when the insertion piece 70 moves a predetermined amount in the vehicle vertical direction or the vehicle transverse direction, the insertion piece 70 abuts the peripheral edge portion 57 of the receiving portion 56. Further, even if the insertion piece 70 rotates a predetermined amount around the direction of insertion into the receiving portion 56, the insertion piece 70 abuts the peripheral edge portion 57 of the receiving portion 56.

Namely, in the first embodiment, even if the receiving portion 56 is structured so as to be one size larger, displacement of the instrument panel R/F 34 with respect to the vehicle body 12, and rotation of the instrument panel R/F 34 around the direction of insertion of the insertion piece 70 into the receiving portion 56, can be restricted. Further, the present invention is not limited to the above-described example, and, in the above-described embodiments, the shapes of the receiving portion and the insertion piece can be changed appropriately in accordance with the precision required for positioning the instrument panel R/F 34.

(7) Note that, although the vehicle 10 relating to the present embodiment is illustrated as a right-hand drive vehicle in FIG. 4, the mounting structures of an instrument panel reinforcement relating to the above-described embodiments can be applied also to a left-hand drive vehicle and not just a right-hand drive vehicle.

DESCRIPTION OF REFERENCE NUMERALS

10 vehicle
12 vehicle body
22 front pillar (vehicle body skeleton member)
30A rear wall portion (mounting surface portion)
34 instrument panel reinforcement
34A end portion
34B end portion
56 receiving portion
57 peripheral edge portion
64B inclined portion (facing portion)
70 insertion piece
30A distal end portion
90 insertion piece
100 first receiving portion (receiving portion)
101 peripheral edge portion
102 second receiving portion (receiving portion)
103 peripheral edge portion
104 first insertion piece (insertion piece)
106 second insertion piece (insertion piece)

What is claimed is:

1. A mounting structure of an instrument panel reinforcement, comprising:
   a receiving portion that is formed at either one of a
      mounting surface portion, that faces a vehicle rear side, of a vehicle body skeleton member that structures a portion of a side portion of a vehicle body, or a facing portion, that faces the mounting surface portion, of an end portion, that is fixed to the mounting surface portion, of the instrument panel reinforcement that extends in a vehicle transverse direction; and an insertion piece that is provided at another of the mounting surface portion or the facing portion, and that is formed so as to be able to be inserted into the receiving portion, and that, by being inserted in the receiving portion, restricts displacement of the instrument panel reinforcement with respect to the vehicle body in two directions that are orthogonal to a direction of insertion into the receiving portion, and restricts rotation of the instrument panel reinforcement around the direction of insertion, wherein the receiving portion and the insertion piece are provided at one vehicle transverse direction side or another vehicle transverse direction side, due to the insertion piece being inserted in the receiving portion, displacement of the insertion piece in the vehicle transverse direction and a vehicle vertical direction, and rotation of the insertion piece around a vehicle longitudinal direction, are restricted, the receiving portion is formed by cutting out the mounting surface portion, and is formed in a quadrangular shape that runs along the vehicle vertical direction as seen from the direction of insertion of the insertion piece, the insertion piece is formed in a shape of a plate that extends from the facing portion, and, in a state of being inserted into the receiving portion, is disposed at an incline with respect to the vehicle vertical direction as seen from the direction of insertion of the insertion piece, and displacement of the insertion piece in the vehicle transverse direction and the vehicle vertical direction, and rotation of the insertion piece around the vehicle longitudinal direction, are restricted due to vehicle vertical direction end portions of the insertion piece abutting a peripheral edge portion of the receiving portion when the insertion piece is inserted into the receiving portion.

2. The mounting structure of an instrument panel reinforcement of claim 1, wherein a width of a distal end portion of the insertion piece is decreased toward a distal end of the insertion piece.

3. The mounting structure of an instrument panel reinforcement of claim 1, wherein surfaces of the mounting surface portion and the facing portion are inclined with respect to the vehicle vertical direction.

4. The mounting structure of an instrument panel reinforcement of claim 1, wherein the insertion piece is inclined at 45 degrees with respect to the vehicle vertical direction as seen from the direction of insertion of the insertion piece.

* * * * *